United States Patent
Manabe et al.

(10) Patent No.: US 8,575,380 B2
(45) Date of Patent: Nov. 5, 2013

(54) BRANCHED POLYETHYLENE GLYCOL LINKED WITH DIACYL GLYCEROL, PROCESS FOR PRODUCING THE SAME, AND POLYETHYLENE GLYCOL MODIFIED LIPOSOME

(71) Applicant: NOF Corporation, Tokyo (JP)

(72) Inventors: Fumiaki Manabe, Kawasaki (JP); Yuji Yamamoto, Kawasaki (JP)

(73) Assignee: NOF Corporation, Tokyo (JP)

( * ) Notice: Subject to any disclaimer, the term of this patent is extended or adjusted under 35 U.S.C. 154(b) by 0 days.

(21) Appl. No.: 13/653,624

(22) Filed: Oct. 17, 2012

(65) Prior Publication Data

US 2013/0116461 A1 May 9, 2013

(30) Foreign Application Priority Data

Oct. 17, 2011 (JP) ................. 2011-227892

(51) Int. Cl.
*C07C 51/00* (2006.01)
*C07C 59/00* (2006.01)

(52) U.S. Cl.
USPC .......................................... 554/149; 554/219

(58) Field of Classification Search
USPC ................................. 554/149, 219
See application file for complete search history.

(56) References Cited

U.S. PATENT DOCUMENTS 6,586,001 B1 7/2003 Zalipsky

OTHER PUBLICATIONS

Improved Pharmacokinetics and Efficacy of a Highly Stable Nanoliposomal Vinorelbine, Daryl C. Drummond et al., The Journal of Pharmacology and Experimental Therapeutics, vol. 328, No. 1, pp. 321-330, English text, 2009.
Development of Lipidoid-siRNA Formulations for Systemic Delivery to the Liver, Akin Akinc et al., The American Society of Gene Therapy, vol. 17, No. 5, pp. 872-879, English text, 2009.

*Primary Examiner* — Deborah D Carr
(74) *Attorney, Agent, or Firm* — Rankin, Hill & Clark LLP

(57) ABSTRACT

Provided is a polyethylene glycol derivative which contains two PEG chains, which is bound to a diacylglycerol, which has high purity, and which enhances the stability of liposomes. Polyethylene glycol is represented by the following formula (1) and which is bound to a diacylglycerol:

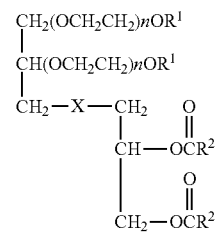

(1)

In Formula (1), $R^1$ is a hydrocarbon group containing 1 to 7 carbon atoms, $R^2$ is an alkyl or alkenyl group containing 9 to 21 carbon atoms, n is the average number of moles of added polyethylene glycol chains, $10 \leq n \leq 100$, and X is a linker site between branched polyethylene glycol and the diacylglycerol and is represented by the following formula (2):

$$-(CH_2)l\text{-}Y\text{-}(CH_2)m\text{-} \qquad (2)$$

In Formula (2), Y is an ether bond, an ester bond, a urethane bond, an amide bond, or a carbonate bond and l and m are an integer of 0 to 6.

8 Claims, No Drawings

BRANCHED POLYETHYLENE GLYCOL LINKED WITH DIACYL GLYCEROL, PROCESS FOR PRODUCING THE SAME, AND POLYETHYLENE GLYCOL MODIFIED LIPOSOME

TECHNICAL FIELD

The present invention relates to branched polyethylene glycol bound to a diacylglycerol, a method for producing the same, and a polyethylene glycol-modified liposome.

BACKGROUND ART

Liposomes are capsules which each composed of a lipid bilayer made of phospholipid and which have a size of several tens to hundreds of nanometers and can stably encapsulate a drug therein. One of the liposomes is a PEG liposome which is surface-modified with polyethylene glycol (PEG). The PEG liposome is inhibited from interacting with serum proteins such as opsonin and cells belonging to a monocytic cell line by a hydrated layer composed of surface PEG chains and the steric hindrance of the PEG chains and therefore can exhibit high retention in blood. In the delivery of anticancer drugs which require particularly high retention in blood, DOXIL®, which is a type of PEG liposome, is commercially available and has been proven in effectiveness.

On the other hand, in the delivery of nucleic acids such as siRNAs which have been intensively investigated in recent years, the PEG liposome is considered one of promising carriers. A siRNA is a nucleic acid drug inhibiting the production of pathogenic proteins, has few side effects, is advantageous in being readily synthesized in large quantities, and therefore is increasingly expected as a next-generation, high-performance drug. However, the siRNA is readily degraded by an internal enzyme in blood. Therefore, it is difficult to use the siRNA alone and a DDS technique for delivering the siRNA is essential. In the delivery of the siRNA using a liposome, an electrostatic complex with a nucleic acid is generally formed by adding an excessive amount of a cationic lipid to the liposome in order to stabilize the nucleic acid and the charge of the whole complex is cationized in order to increase the intake by cells.

One of components of the PEG liposome is phospholipid PEG, which contains a phosphoric group exhibiting anionicity and may possibly have negative influence on encapsulation depending on the type of a drug (Patent Literature 1 and Non Patent Literature 1). In particular, the phospholipid PEG is unsuitable for the encapsulation of a complex which contains the siRNA and which exhibits anionicity as a whole in some cases. Therefore, lipid PEG with no charge is attracting attention. It has been reported that when a liposome is composed of the lipid PEG, the liposome exhibits excellent stability and disposition (Non Patent Literature 2).

[Patent Literature 1] U.S. Pat. No. 6,586,001
[Non Patent Literature 1] THE JOURNAL OF PHARMACOLOGY AND EXPERIMENTAL THERAPEUTICS, Vol. 328, No. 1, 321-330
[Non Patent Literature 2] Molecular Therapy, Vol. 17, No. 5, 872-879

DISCLOSURE OF INVENTION

Problems to be Solved by Invention

Uncharged lipid PEG with a single PEG chain has established a track record as a carrier for siRNAs; however, some problems including the stability of liposomes remain. For medical use, it is particularly important to enhance the stability of liposomes.

It is an object of the present invention to provide a polyethylene glycol derivative which contains two PEG chains, which is bound to a diacylglycerol, which has high purity, and which enhances the stability of liposomes.

Means for Solving Problems

The developers have used branched polyethylene glycol to develop polyethylene glycol which has higher liposome stability as compared to a linear type and which is bound to a diacylglycerol.

Furthermore, the following derivative has been developed by the use of a production method characterized in that ethylene oxide is added from a diol compound having a characteristic structure for the introduction of branched polyethylene glycol: a polyethylene glycol derivative which contains a stable ether linker, which has extremely high purity, and which is bound to a diacylglycerol.

That is, the present invention relates to branched polyethylene glycol which is represented by Formula (1) and which is bound to a diacylglycerol.

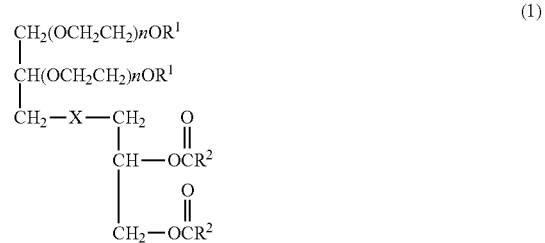

(In Formula (1), $R^1$ is a hydrocarbon group containing 1 to 7 carbon atoms, $R^2$ is an alkyl or alkenyl group containing 9 to 21 carbon atoms, n is the average number of moles of added polyethylene glycol chains, $10 \leq n \leq 100$, and X is a linker site between branched polyethylene glycol and the diacylglycerol and is represented by Formula (2).

(In Formula (2), Y represents an ether bond, an ester bond, a urethane bond, an amide bond, or a carbonate bond and l and m are an integer of 0 to 6).

Furthermore, the present invention relates to a method for producing branched polyethylene glycol which is represented by Formula (3) and which is bound to a diacylglycerol, the method being characterized by including Steps (A), (B), (C), and (D) below.

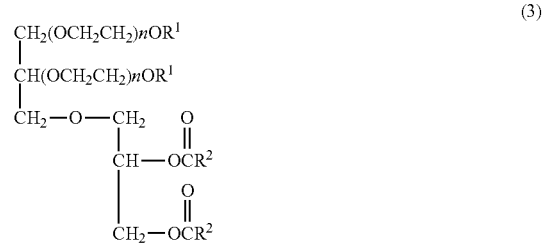

(In Formula (3), $R^1$ is a hydrocarbon group containing 1 to 7 carbon atoms, $R^2$ is an alkyl or alkenyl group containing 9 to 21 carbon atoms, n is the average number of moles of added polyethylene glycol chains, and $10 \leq n \leq 100$.)

Advantageous Effects of Invention

A branched polyethylene glycol derivative which is obtained by a technique according to the present invention and which is bound to a diacylglycerol has achieved significantly higher liposome stability as compared to linear polyethylene glycol.

The branched polyethylene glycol derivative can be produced at extremely high purity, which is desirable for DDS materials.

DESCRIPTION OF EMBODIMENTS

Branched polyethylene glycol bound to a diacylglycerol according to the present invention is a compound in which a structure having two polyethylene glycol chains is bound to a structure having the diacylglycerol through a linker and can prepare a more stable liposome as compared to linear polyethylene glycol.

The branched polyethylene glycol bound to the diacylglycerol is represented by Formula (1).

X is a linker site between the branched polyethylene glycol and the diacylglycerol and is represented by Formula (2).

Y is an ether bond, an ester bond, a urethane bond, an amide bond, or a carbonate bond and is most preferably the ether bond, which is chemically stable. Furthermore, l and m each represent the number of carbon atoms in an alkyl group and satisfy $0 \leq l$ and $m \leq 6$, respectively. It is preferred that $l \leq 3$ and $m \leq 3$. It is most preferred that $l=0$ and $m=0$.

In Formula (1), $R^1$ represents a hydrocarbon group containing 1 to 7 carbon atoms. The number of carbon atoms in $R^1$ is more preferably 4 or less and further more preferably 1 or less. The hydrocarbon group is preferably an alkyl group or an aromatic group and particularly preferably the alkyl group. Examples of the hydrocarbon group include a methyl group, an ethyl group, a propyl group, an isopropyl group, a butyl group, a tertiary butyl group, a pentyl group, a hexyl group, a heptyl group, and a benzyl group. The methyl group is most preferred.

In Formula (1), $R^2$ is an alkyl or alkenyl group containing 9 to 21 carbon atoms. The number of carbon atoms in $R^2$ is preferably 13 to 17 and more preferably 17. $R^2$ may be saturated and unsaturated hydrocarbons or a linear or branched chain. $R^2$ is one derived from an aliphatic acid $R^2COOH$. $R^2CO$ is an acyl group derived from an aliphatic acid with a saturated linear or branched chain and an unsaturated linear or branched chain. In particular, the following acids are preferred: capric acid, lauric acid, myristic acid, palmitic acid, palmitoleic acid, stearic acid, isostearic acid, oleic acid, and linoleic acid.

(Synthesis of Intermediate)

An intermediate according to the present invention can be produced as described below. First, diglycerin is allowed to react with acetone, followed by extractive purification using an organic solvent and water, whereby 1,2-isopropylidene diglycerin represented by Formula (4) can be obtained. This compound is known.

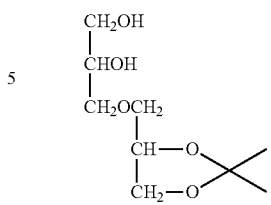

Next, the intermediate is obtained through Steps (A) to (C).

Step (A): Ethylene oxide is added to the compound represented by Formula (4) using sodium methylate, metallic sodium, metallic potassium, or t-butoxy potassium as a catalyst, whereby a polyethylene glycol derivative represented by Formula (5) below is obtained.

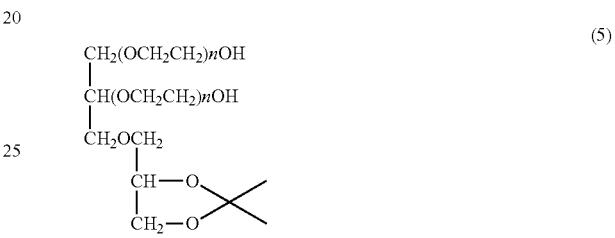

(In Formula (5), n is the average number of moles of added polyethylene glycol chains and $10 \leq n \leq 100$.)

As described above, the use of the addition polymerization reaction of ethylene oxide allows a high-purity branched polyalkylene glycol derivative to be produced in high yield in an industrially relevant way without column purification.

This ethylene oxide addition polymer can be produced by a method below. This polymer can be produced in such a way that oxyethylene is polymerized in toluene or in the absence of any solvent under alkaline conditions using metallic sodium, metallic potassium, sodium hydride, potassium hydride, sodium methoxide, or potassium t-butoxide.

Step (B): Hydrogen atoms of terminal hydroxyl groups of ethylene oxide groups in the polyethylene glycol derivative represented by Formula (5) are substituted by hydrocarbon groups, whereby a polyethylene glycol derivative represented by Formula (6) is obtained.

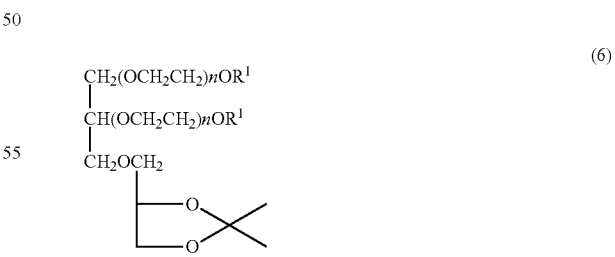

(In Formula (6), $R^1$ is a hydrocarbon group containing 1 to 7 carbon atoms, n is the average number of moles of added polyethylene glycol chains, and $10 \leq n \leq 100$.)

Herein, a compound in which $R^1$ is, for example, a methyl group has a structure represented by Formula (8).

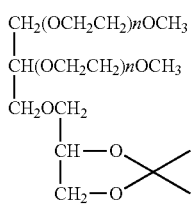

$$\begin{array}{c} CH_2(OCH_2CH_2)_nOCH_3 \\ | \\ CH(OCH_2CH_2)_nOCH_3 \\ | \\ CH_2OCH_2 \\ | \\ CH-O \\ | \\ CH_2-O \end{array} \qquad (8)$$

Step (C): The polyethylene glycol derivative represented by Formula (6) is subjected to acid hydrolysis at a pH of 1.0 to 3.0, whereby a polyethylene glycol derivative represented by Formula (7) is obtained as an intermediate.

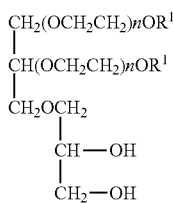

$$\begin{array}{c} CH_2(OCH_2CH_2)_nOR^1 \\ | \\ CH(OCH_2CH_2)_nOR^1 \\ | \\ CH_2OCH_2 \\ | \\ CH-OH \\ | \\ CH_2-OH \end{array} \qquad (7)$$

(In Formula (7), $R^1$ is a hydrocarbon group containing 1 to 7 carbon atoms, n is the average number of moles of added polyethylene glycol chains, and $10 \leq n \leq 100$.)

That is, the deprotection of a cyclic acetal group is carried out in an aqueous solution adjusted to a pH of 1.0 to 3.0 using an acid such as acetic acid, phosphoric acid, hydrochloric acid, or sulfuric acid, whereby the compound represented by Formula (7) is obtained. When the pH during deprotection is extremely low, the degradation of polyalkylene glycol chains or the liberation of the polyalkylene glycol chains due to the breakage of an ether bond between the 2- and 3-positions of a glycerol occurs.

Herein, a compound in which $R^1$ is, for example, a methyl group has a structure represented by Formula (9).

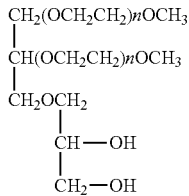

$$\begin{array}{c} CH_2(OCH_2CH_2)_nOCH_3 \\ | \\ CH(OCH_2CH_2)_nOCH_3 \\ | \\ CH_2OCH_2 \\ | \\ CH-OH \\ | \\ CH_2-OH \end{array} \qquad (9)$$

(Synthesis of Compound Represented by Formula (3))

In subsequent Step (D), terminal hydroxyl groups in the polyethylene glycol derivative represented by Formula (7) and an aliphatic acid are subjected to dehydrocondensation, whereby the branched polyethylene glycol represented by Formula (3).

That is, the compound, represented by Formula (7), containing two hydroxyl groups and the aliphatic acid are subjected to condensation using a catalyst, whereby a branched polyethylene glycol derivative, represented by Formula (3), bound to the diacylglycerol through ether is obtained.

Examples of the aliphatic acid $R^2COOH$ used include saturated and unsaturated linear or branched aliphatic acids such as capric acid, lauric acid, myristic acid, palmitic acid, palmitoleic acid, stearic acid, isostearic acid, oleic acid, and linoleic acid.

(Liposome)

A liposome containing a lipid PEG derivative according to the present invention can encapsulate nucleic acids, drugs, and bioactive substances. The type of these nucleic acids and drugs is not particularly limited. The amount of the lipid PEG according to the present invention that is blended in the lipid PEG may be sufficient to express genes or sufficient to allow the drugs to be effective.

Examples of the nucleic acids include RNAs, DNAs, and oligonucleotides. There are, for example, siRNAs, antisense RNAs, antisense DNAs, antisense oligonucleotides, enzymes, cytokines, and the like.

In an exemplary example of the case where a nucleic acid is encapsulated, the liposome contains a mixture of the lipid PEG derivative according to the present invention, a neutral lipid (for example, diacylphosphatidylcholine), a sterol (for example, cholesterol), and a cationic lipid (for example, an aminolipid).

The form of the liposome containing the lipid PEG derivative according to the present invention is not particularly limited and may be, for example, a form in which a lipid mixture is dissolved in an organic solvent such as chloroform and is dried by desolventization using an evaporator, a form in which the lipid mixture is dispersed in an aqueous solvent, or a form in which the liposome dispersed in the aqueous solvent is freeze-dried.

In the case of using the aqueous solvent, only water may be used or a mixed solvent containing a small amount of alcohol or the like may be used. Pharmacopoeia water for injection, distilled water, or the like is preferably used. In this case, a solution prepared by dissolving a bioactive substance, a protein, a buffer substance, various types of salts, blood plasma, and/or the like in the aqueous solvent may be used.

A form in which the lipid mixture is dispersed in the aqueous solvent is not particularly limited and can be obtained by emulsifying a dispersion using a homogenizer, a high-pressure jet emulsifying apparatus, or the like or can be obtained as a liposome with uniform particle size using an extruder, Liponizer, or the like.

A method for producing a form in which a mixture of the lipid mixture, the nucleic acid, and a drug is dispersed in an aqueous medium may be known one and may be appropriately selected. Examples of the production method include, but are not limited to, a method in which the mixture of the lipid mixture, the nucleic acid, and the drug is added to the aqueous solvent, followed by emulsification using an emulsifying apparatus such as a homogenizer, an ultrasonic emulsifying apparatus, a high-pressure jet emulsifying apparatus, or the like; a method in which the aqueous solvent containing the nucleic acid and the drug is added to lipid dry matter, followed by emulsification; a method in which the aqueous medium containing the nucleic acid and the drug is added to the liposome dispersed in the aqueous medium; and a method in which the aqueous medium containing the nucleic acid and the drug is added to the liposome dispersed in the aqueous solvent.

In the case where the size (particle size) of the liposome needs to be controlled, extrusion filtration or the like may be performed under high pressure using a membrane filter with uniform pore size and an extruder or the like. The particle size of the liposome is preferably 50 nm to 500 nm and more preferably 50 nm to 300 nm.

EXAMPLES

The present invention is further described below in detail on the basis of examples. In the examples, 1H NMR, GPC, and TOF-MS were used to analyze or identify compounds.

(Method for 1H NMR Analysis)

In 1H NMR analysis, JNM-ECP400 and JNM-ECP600 manufactured by JEOL Datum Ltd. were used. The integrals of NMR measurements are theoretical values.

(Method for GPC Analysis)

In GPC analysis, a GPC system used was SHODEX GPC SYSTEM-11 and measurement was performed under conditions below.

Developing solvent: tetrahydrofuran
Flow rate: 1 mL/min
Columns: SHODEX KF-801, KF-803, KF-804 (I. D. 8 mm×30 cm)
Column temperature: 40° C.
Detector: RI×8
Amount of sample: 1 mg/g,
100 µL References used were triethylene glycol, PEG4000, and PEG20000.

GPC measurements were described together with analytical values for main peaks obtained by cutting off high-molecular weight impurities and low-molecular weight impurities from elution curves perpendicularly from points of inflection to the baselines of the elution curves and analytical values for whole peaks from the start point to end point of elution.

$M_n$ represents the number-average molecular weight, $M_w$ represents the weight-average molecular weight, and $M_p$ represents the peak top molecular weight.

(Method for TOF-MS Analysis)

In TOF-MS analysis, autoflexIII) manufactured by Bruker was used. A sample matrix used was 1,8,9-Anthracenetriol and references used were Angiotensin II[M+H]1+Mono with a molecular weight of 1,046.5418 and Somatostain 28[M+H]1+Mono with a molecular weight of 3,147.4710.

Example 1

Synthesis of Compound Represented by Formula (1) (the case where $R^1$=a methyl group, $R^2$=a hydrocarbon containing 17 carbon atoms, and a single polyethylene glycol chain has a molecular weight of about 1,000.)

(Synthesis of Compound Represented by Formula (4))

Into a 3,000-mL round-bottomed flask equipped with a thermometer, a nitrogen-blowing tube, and an agitator, 807 g of diglycerin, 1,614 g (5.7 mol eq.) of acetone, and trifluoroacetic acid (1 mole percent) were added, followed by reaction at 25° C. for three hours. After reaction, neutralization was performed using triethylamine (5 mole percent) and acetone was concentrated. Thereafter, hexane (1,600 g) and water (1,600 g) were added and hexane/water extraction was performed. A hexane layer was removed, new hexane (1,600 g) was added, and hexane/water extraction was performed. This extraction was performed five times in total. After a hexane layer was removed, 533 g of common salt was dissolved in a water layer, chloroform (1,600 g) was added, and 25% aqueous common salt solution/chloroform extraction was performed. The water layer was removed, a new 25% aqueous common salt solution was added, and 25% aqueous common salt solution/chloroform (1,600 g) extraction was performed. This extraction was performed five times in total. A chloroform layer was concentrated. A concentrated liquid was dried under reduced pressure at 40° C. with nitrogen blown into the concentrated liquid, whereby 147 g of 1,2-isopropylidene diglycerin represented by Formula (4) was obtained (a molar yield of 27%).

$^1$H-NMR (DMSO, internal standard TMS) δ (ppm): 1.26, 1.31 (3H, 3H, s C(CH$_3$)$_2$) 3.30-3.66 (8H, m C(CH$_3$)$_2$OCH$\underline{H}$, —C$\underline{H_2}$—O—C$\underline{H_2}$—, C$\underline{H_2}$OH, C$\underline{H}$(OH)) 3.96-3.98 (1$\underline{H}$, t, C(CH$_3$)$_2$OCH$\underline{H}$) 4.14-4.17 (1H, m, C(CH$_3$)$_2$OC$\underline{H}$) 4.46-4.48 (1H, t, CH$_2$O$\underline{H}$) 4.62-4.63 (1H, m, C$\underline{H}$(OH))

(Step (A))

In to a 5-L autoclave, 50 g (0.24 mol) of 1,2-isopropylidene diglycerin, 202 g of dehydrated toluene, and 3.56 g (0.018 mol, 7.5 mole percent) of a 28% methanol solution of sodium methoxide were charged. After the autoclave was heated to 60° C., demethanolation was performed for 30 minutes in such a manner that the degree of vacuum was adjusted to 100 mHg with nitrogen blown into the autoclave. After the inside of the system was replaced with nitrogen, the system was heated to 100° C. and 499 g (11.3 mol) of ethylene oxide was added thereto with a pressure of 0.5 MPa or less, followed by reaction for two hours and 30 minute. An unreacted ethylene oxide gas was removed under reduced pressure, followed by cooling to 70° C., whereby a compound represented by Formula (10) was obtained.

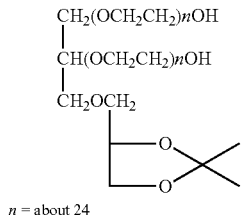

(10)

$n$ = about 24

$^1$H-NMR (CDCl$_3$, internal standard TMS) δ (ppm): 1.36, 1.41 (3H, 3H, s C(CH$_3$)$_2$) 3.44-3.75 (200H, m, —CH$_2$O(CH$_2$CH$_2$O)nH, CHHO(CH$_2$CH$_2$O)$_n$H, C(CH$_3$)$_2$OCH$\underline{H}$, —C$\underline{H_2}$OC$\underline{H_2}$—) 4.03-4.06 (1$\underline{H}$, t, C(CH$_3$)$_2$OCH$\underline{H}$) 4.25 (1H, m, C(CH$_3$)$_2$OC$\underline{H}$) GPC analysis:

(Main Peak)
Number-average molecular weight ($M_n$): 1,996
Weight-average molecular weight ($M_w$): 2,058
Polydispersity: 1.031
Peak top molecular weight ($M_p$): 2,067

(Whole Peak)
Number-average molecular weight ($M_n$): 1,922
Weight-average molecular weight ($M_w$): 2,019
Polydispersity: 1.051
TOF-MS 2,312.9

(Step (B))

Into a 500-mL round-bottomed flask equipped with a thermometer, a nitrogen-blowing tube, an agitator, a Dean-stark tube, and a cooling tube, 100 g (43 mmol) of the compound represented by Formula (10), 0.10 g (0.45 mmol) of 2,6-di-tert-butyl-p-cresol, and 300 g of toluene were charged, followed by heating under reflux, whereby water was azeotropically removed. After cooling to 40° C., 15.1 g (149 mmol) of triethylamine and 14.0 g (122 mmol) of methanesulfonic chloride were added, followed by reaction at 40° C. for three hours. Thereafter, 50.4 g (260 mmol) of a 28% methanol solution of sodium methoxide was added, followed by reaction for 13 hours. Subsequently, demethanolation was performed at 40° C. under reduced pressure with nitrogen blown thereinto. After 100 g of toluene and 0.10 g (0.45 mmol) of 2,6-di-tert-butyl-p-cresol were added, filtration was performed. After toluene was concentrated, the filtrate was transferred to the 500-mL round-bottomed flask and the flask was heated under reflux until the amount of toluene in the flask was reduced to about 300 g, whereby water was removed. After cooling to 40° C., 15.1 g (149 mmol) of triethylamine and 14.0 g (122 mmol) of methanesulfonic chloride were added, followed by reaction at 40° C. for three hours. Thereafter, 50.4 g (260 mmol) of a 28% methanol solution of sodium methoxide was added, followed by reaction for four hours. Subsequently, demethanolation was performed at 40° C. under reduced pressure with nitrogen blown thereinto. The following compounds were added: 100 g of toluene and 0.10 g (0.45 mmol) of 2,6-di-tert-butyl-p-cresol. Toluene/water extraction was performed at 50° C. using a 25% aqueous common salt solution. This water washing was performed twice in total. After being filtered, a toluene layer was concentrated. Toluene was added such that the amount of contents was 600 g. After cooling to 10° C., 600 g of hexane was added, followed by crystallization at 10° C. or lower. After crystals were separated by filtration, 800 g of hexane and 0.16 g (0.73 mmol) of 2,6-di-tert-butyl-p-cresol were added and the crystals were washed, whereby 84 g of a compound represented by Formula (11) was obtained (a yield of 84%).

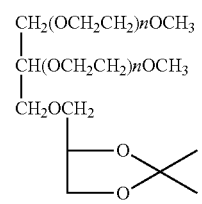

$n$ = about 24

(11)

$^1$H-NMR (CDCl$_3$, internal standard TMS) δ (ppm): 1.36, 1.41 (3H, 3H, s C(CH$_3$)$_2$) 3.38 (6H, s, —CH$_2$—O—(CH$_2$CH$_2$O)nH$_3$, —CHO(CH$_2$CH$_2$O)nCH$_3$) 3.44-3.75 (200H, m, —CH$_2$ (CH$_2$CH$_2$O)nCH$_3$, CHO(CH$_2$CH$_2$O)nCH$_3$, CH$_2$O)nCH$_3$, C(CH$_3$)$_2$OCHH, —CH$_2$OCH$_2$—), 4.03-4.06 (1H, t, C(CH$_3$)$_2$OCHH), 4.23-4.26 (1H, m, C(CH$_3$)$_2$OCH) GPC analysis:
(Main Peak)
  Number-average molecular weight (M$_n$): 2,119
  Weight-average molecular weight (M$_w$): 2,181
  Polydispersity: 1.029
  Peak top molecular weight (M$_p$): 2,181
(Whole Peak)
  Number-average molecular weight (M$_n$): 2,108
  Weight-average molecular weight (M$_w$): 2,232
  Polydispersity: 1.059
(Step (C))

After 40 g (17 mmol) of the compound represented by Formula (11) and 500 g of water for injection were put into a 1-L beaker and the compound represented by Formula (11) was dissolved therein, an 85% aqueous solution of phosphoric acid was added, whereby the pH of the solution was adjusted to 1.8. Subsequently, acid hydrolysis was performed at an elevated temperature of 50° C. for one hour and 30 minutes. After hydrolysis, neutralization to a pH of 7.0 was performed using a 400 g/L aqueous solution of sodium hydroxide. Water/chloroform extraction was performed by adding 200 g of chloroform. This extraction was performed twice. Thereafter, a chloroform layer was concentrated and was dissolved in 200 g of toluene, 12 g of magnesium sulfate was added, and dehydration was performed at 25° C. After filtration, the vessel was washed with 120 g of toluene and a toluene solution was then cooled to 10° C. or lower. Subsequently, 240 g of hexane was added, followed by crystallization at 10° C. or lower. After crystals were separated by filtration, 240 g of hexane was added and the crystals were washed, whereby 34 g of a compound represented by Formula (12) was obtained (a yield of 85%).

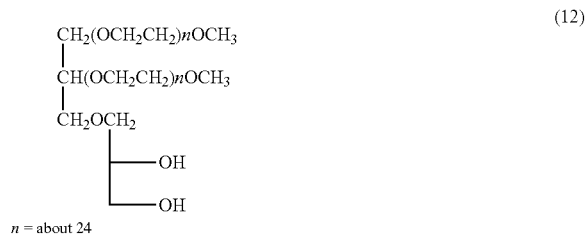

$n$ = about 24

(12)

$^1$H-NMR (CDCl$_3$, internal standard TMS) δ (ppm): δ 3.38 (6H, s, —CH$_2$—O—(CH$_2$CH$_2$O)nH$_3$, —CHO(CH$_2$CH$_2$O)nCH$_3$) 3.49-3.85 (202H, m, —CH$_2$ (CH$_2$CH$_2$O)nCH$_3$, C HO(CH$_2$CH$_2$O)nCH$_3$, —CH$_2$OCH$_2$—, CH$_2$OH—CH(OH)—), GPC analysis:
(Main Peak)
  Number-average molecular weight (M$_n$): 2,062
  Weight-average molecular weight (M$_w$): 2,120
  Polydispersity: 1.028
  Peak top molecular weight (M$_p$): 2,115
(Whole Peak)
  Number-average molecular weight (M$_n$): 2,070
  Weight-average molecular weight (M$_w$): 2,178
  Polydispersity: 1.052
(Step (D))

Into a 100-mL round-bottomed flask equipped with a thermometer, a nitrogen-blowing tube, an agitator, and a cooling tube, 4.0 g (14 mmol) of stearic acid and 32 g of toluene were charged, followed by heating to 40° C., whereby stearic acid was dissolved. Subsequently, 2.3 g (11 mmol) of dicyclohexylcarbodiimide, 8.0 g (3.5 mmol) of the compound represented by Formula (12), and 0.425 g (3.5 mmol) of N,N-dimethyl-4-aminopyridine were added, followed by heating to 60° C. Reaction was carried out at 60° C. for one hour and 30 minutes, followed by filtration and concentration. Thereafter, the concentrate was dissolved in 40 g of acetonitrile, 160 g of hexane was added, and hexane/acetonitrile extraction was performed. A hexane layer was removed, 160 g of new hexane was added, and hexane/acetonitrile extraction was performed again. This extraction was performed five times in total. After an acetonitrile layer was concentrated, the acetonitrile layer was dissolved in 45 g of ethyl acetate and N,N-dimethyl-4-aminopyridine was removed by adsorption using an adsorbent "Kyowaad 700" (produced by Kyowa Chemical Industry Co., Ltd.). After filtration, concentration was performed, whereby 7.2 g of a compound represented by Formula (13) was obtained (a yield of 73%).

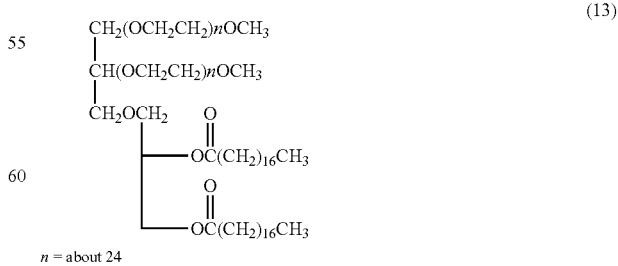

$n$ = about 24

(13)

$^1$H-NMR (CDCl$_3$, internal standard TMS) δ (ppm): δ 0.86-0.90 (6H, t, —CHCO$_2$CH$_2$CH$_2$(CH$_2$)$_{14}$CH$_3$, —CH$_2$CO$_2$CH$_2$CH$_2$(CH$_2$)$_{14}$CH$_3$) 1.15-1.35 (56H, m, —CHCO$_2$CH$_2$CH$_2$(CH$_2$)$_{14}$CH$_3$, —CH$_2$CO$_2$CH$_2$CH$_2$(CH$_2$)$_{14}$CH$_3$) 1.55-1.65 (4H, m, —CHCO$_2$CH$_2$CH$_2$(CH$_2$)$_{14}$CH$_3$, —CH$_2$CO$_2$CH$_2$CH$_2$(CH$_2$)$_{14}$CH$_3$) 2.27-2.32 (4H, m, —CHCO$_2$CH$_2$CH$_2$(CH$_2$)$_{14}$CH$_3$, —CH$_2$CO$_2$CH$_2$CH$_2$(CH$_2$)$_{14}$CH$_3$) 3.38 (6H, s, —CH$_2$—O—(CH$_2$CH$_2$O)n H$_3$, —CHO(CH$_2$CH$_2$O)nCH$_3$), 3.49-3.85 (199H, m, —CH$_2$O(CH$_2$CH$_2$O)nCH$_3$, CHO(CH$_2$CH$_2$O)nCH$_3$, —CH$_2$OC H$_2$—,) 4.11-4.16 (1H, m, —CHHCO$_2$CH$_2$CH$_2$(CH$_2$)$_{14}$CH$_3$) 4.31-4.34 (1H, d, —CHHCO$_2$CH$_2$CH$_2$(CH$_2$)$_{14}$CH$_3$) 5.18-5.20 (1H, m, —CHCO$_2$CH$_2$CH$_2$(CH$_2$)$_{14}$CH$_3$)

The obtained compound represented by Formula (13) was developed by TLC (thin-layer chromatography; chloroform/methanol=85/15, 90/10) and was then investigated by color development with iodine, resulting in that the purity was 98% or more (a reference used was methoxy-terminated polyethylene glycol with a molecular weight of 2,000).

Remaining aliphatic acids were developed by TLC (thin-layer chromatography:chloroform/methanol=99/5) and were analyzed by color development with phosphoric acid-copper sulfate. As a result, remaining stearic acid was 0.05% or less.

(Evaluation as Liposome)

In chloroform, 6.059 g (7.7 mmol) of hydrogenated soy phosphatidylcholine and 1.0 g (2.6 mmol) of cholesterol were dissolved. Thereafter, a solvent was removed with an evaporator, followed by vacuum drying for six hours. Subsequently, 0.07 g of the lipid dry matter was weighed and was hydrated by adding 20 mL of water, followed by light stirring with a vortex mixer placed in a hot water bath. The lipid dispersion was sized using a polycarbonate membrane filter with a pore size of 0.2 μm, whereby a liposome liquid was prepared (0.2 μm×twice). Five sets of the liposome liquid were prepared and were named Liposome Liquids (i) and (ii).

Example A

In 5 mL of water, 0.072 g (2.57×10$^{-2}$ mmol) of branched methyl polyethylene glycol bound to distearylglycerol was dissolved, the branched methyl polyethylene glycol being obtained in Step (D) and being represented by Formula (13), whereby a dispersion (5.1 mM) was prepared. The dispersion was added to Liposome Liquid (i), followed by agitation at 60° C. for one hour, whereby a branched polyethylene glycol-modified liposome (A) was prepared (a lipid concentration of 4 mM, a PEG concentration of 1 mM).

Comparative Example B

In 5 mL of water, 0.068 g (2.57×10$^{-2}$ mmol) of a compound (polyethylene glycol with a molecular weight of 2,000) represented by Formula (14) below, whereby a dispersion (5.1 mM) was prepared. This dispersion was added to Liposome Liquid (ii), followed by agitation at 60° C. for one hour, whereby a linear polyethylene glycol-modified liposome (B) was prepared (a lipid concentration of 4 mM, a PEG concentration of 1 mM).

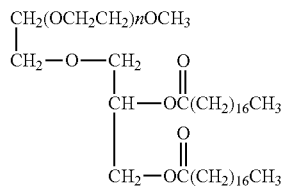

(14)

n = about 48

(Investigation of Stability of Polyethylene Glycol-modified Liposomes)

In order to evaluate the stability of polyethylene glycol-modified liposomes, the two polyethylene glycol-modified liposomes each obtained in Example A or Comparative Example B were placed in a 40° C. constant low-temperature bath (LTI-700E: EYELA) and were evaluated for stability at the first, second, or third month. Results are shown in the table.

TABLE 1

| | Compound | Polyethylene glycol-modified liposome | Stability at 40° C. | | |
|---|---|---|---|---|---|
| | | | First month | Second month | Third month |
| Example A | (13) | (A) Branched | ◯ | ◯ | ◯ |
| Comparative Example C | (14) | (B) Linear | ◯ | X Co-agulated | — |

◯: Good
X: Coagulated

As a result of the evaluation of the stability of the polyethylene glycol-modified liposomes at 40° C., the polyethylene glycol-modified liposome (A), containing branched polyethylene glycol bound to a diacylglycerol according to the present invention, obtained in Example A was stable after three months elapsed.

On the other hand, the polyethylene glycol-modified liposome using conventional linear polyethylene glycol was coagulated at the second month.

As described above, it has become clear that a polyethylene glycol-modified liposome containing branched polyethylene glycol bound to a diacylglycerol according to the present invention is more stable than liposomes using conventional linear polyethylene glycol.

The invention claimed is:

1. Branched polyethylene glycol which is represented by the following formula (1) and which is bound to a diacylglycerol:

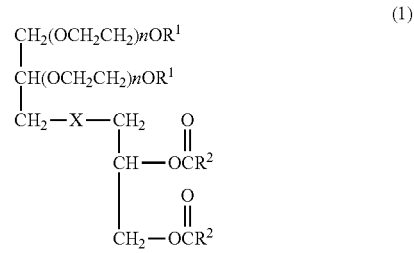

(1)

wherein R$^1$ is a hydrocarbon group containing 1 to 7 carbon atoms, R$^2$ is an alkyl or alkenyl group containing 9 to 21 carbon atoms, n is the average number of moles of added polyethylene glycol chains, 10≤n≤100, and X is a linker site between branched polyethylene glycol and the diacylglycerol and is represented by the following formula (2):

—(CH$_2$)$_l$-Y—(CH$_2$)$_m$-  (2)

where Y is an ether bond, an ester bond, a urethane bond, an amide bond, or a carbonate bond and l and m are an integer of 0 to 6.

2. The branched polyethylene glycol according to claim 1, wherein in Formula (2), Y is the ether bond.

3. The branched polyethylene glycol according to claim 1, wherein in Formula (2), l=0 and m=0.

4. The branched polyethylene glycol according to claim 2, wherein in Formula (2), l=0 and m=0.

5. A polyethylene glycol-modified liposome containing the branched polyethylene glycol according to claim 1.

6. A polyethylene glycol-modified liposome containing the branched polyethylene glycol according to claim 2.

7. A polyethylene glycol-modified liposome containing the branched polyethylene glycol according to claim 3.

8. A method for producing branched polyethylene glycol which is represented by the following formula (3) and which is bound to a diacylglycerol:

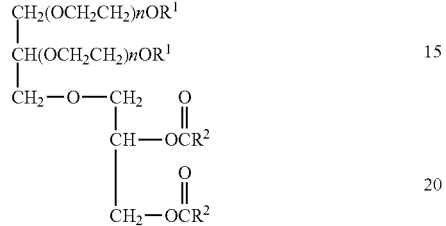

(3)

where $R^1$ is a hydrocarbon group containing 1 to 7 carbon atoms, $R^2$ is an alkyl or alkenyl group containing 9 to 21 carbon atoms, n is the average number of moles of added polyethylene glycol chains, and $10 \leq n \leq 100$, the method comprising:

(A) a step of adding ethylene oxide to a compound represented by the following formula (4) to obtain a polyethylene glycol derivative represented by the following formula (5):

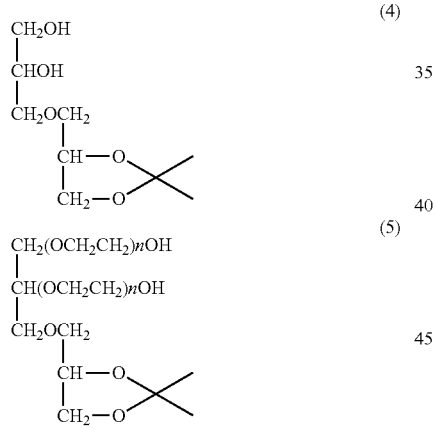

(4)

(5)

where n is the average number of moles of added polyethylene glycol chains and $10 \leq n \leq 100$, (B) a step of substituting hydrogen atoms of terminal hydroxyl groups of ethylene oxide groups in the polyethylene glycol derivative represented by Formula (5) by hydrocarbon groups to obtain a polyethylene glycol derivative represented by the following formula (6):

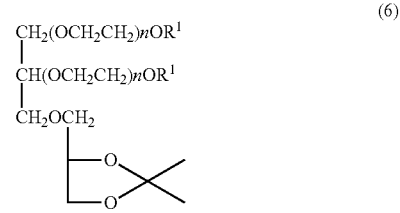

(6)

where $R^1$ is a hydrocarbon group containing 1 to 7 carbon atoms, n is the average number of moles of added polyethylene glycol chains, and $10 \leq n \leq 100$, (C) a step of subjecting the polyethylene glycol derivative represented by Formula (6) to acid hydrolysis at a pH of 1.0 to 3.0 to obtain a polyethylene glycol derivative represented by the following formula (7):

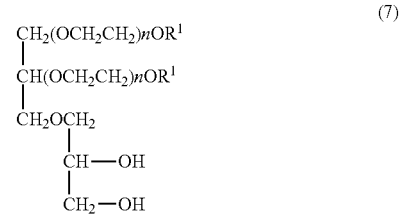

(7)

where $R^1$ is a hydrocarbon group containing 1 to 7 carbon atoms, n is the average number of moles of added polyethylene glycol chains, and $10 \leq n \leq 100$, and (D) a step of subjecting terminal hydroxyl groups in the polyethylene glycol derivative represented by Formula (7) and an aliphatic acid to dehydrocondensation to obtain the branched polyethylene glycol represented by Formula (3).

* * * * *